(12) United States Patent
Koziolek et al.

(10) Patent No.: US 11,099,864 B2
(45) Date of Patent: Aug. 24, 2021

(54) RESPONSIVE AUTO-LAYOUTING OF INDUSTRIAL PROCESS GRAPHICS

(71) Applicant: ABB Schweiz AG, Baden (CH)

(72) Inventors: Heiko Koziolek, Karlsruhe (DE); Michael Vach, Wilhelmsfeld (DE); Jens Doppelhamer, Ladenburg (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/830,295

(22) Filed: Mar. 26, 2020

(65) Prior Publication Data

US 2020/0310840 A1 Oct. 1, 2020

(30) Foreign Application Priority Data

Mar. 28, 2019 (EP) .................................... 19165872

(51) Int. Cl.
*G06F 3/048* (2013.01)
*G06F 9/451* (2018.01)

(52) U.S. Cl.
CPC .............. *G06F 9/451* (2018.02); *G06F 3/048* (2013.01)

(58) Field of Classification Search
CPC ................................. G06F 9/451; G06F 3/048
USPC ....................................................... 715/765
See application file for complete search history.

(56) References Cited

U.S. PATENT DOCUMENTS

| | | | | |
|---|---|---|---|---|
| 8,839,233 B2 * | 9/2014 | Kaegi | ............... | H04L 67/10 717/176 |
| 9,239,665 B2 | 1/2016 | Timsjo et al. | | |
| 9,383,890 B2 * | 7/2016 | Grubbs | ............... | G06F 3/04817 |
| 9,494,952 B2 * | 11/2016 | Storm | ............... | G05B 15/02 |
| 10,268,666 B2 * | 4/2019 | Shuler | ............... | G06F 40/106 |
| 10,318,570 B2 * | 6/2019 | Billi-Duran | ............. | G06F 16/41 |
| 10,388,075 B2 * | 8/2019 | Schmirler | ............... | G06F 3/147 |
| 10,564,425 B2 * | 2/2020 | Bamberger | ........... | G06F 1/1694 |
| 10,712,937 B2 * | 7/2020 | Wagener | ............... | G06F 3/0483 |
| 10,735,691 B2 * | 8/2020 | Schmirler | .......... | H04N 5/23238 |
| 10,824,320 B2 * | 11/2020 | Hsu | ............... | G06F 3/0485 |
| 10,866,631 B2 * | 12/2020 | Nguyen | ................. | G06T 11/00 |
| 10,891,028 B2 * | 1/2021 | Shinohara | ............. | G06F 3/0338 |
| 2009/0228838 A1 | 9/2009 | Ryan et al. | | |
| 2010/0088627 A1 | 4/2010 | Enkerud et al. | | |
| 2012/0254792 A1 | 10/2012 | Husoy et al. | | |
| 2013/0076797 A1 | 3/2013 | Hou | | |
| 2017/0062012 A1 * | 3/2017 | Bloch | ..................... | G11B 27/36 |
| 2017/0101069 A1 * | 4/2017 | Byrne | ................. | H04L 67/125 |
| 2017/0177292 A1 * | 6/2017 | Agili | ...................... | G09G 5/391 |
| 2017/0262602 A1 * | 9/2017 | Schweizer | ............. | G16H 40/63 |
| 2017/0293418 A1 | 10/2017 | Hams et al. | | |
| 2019/0087069 A1 * | 3/2019 | McCauley | ......... | G05B 19/0423 |

(Continued)

FOREIGN PATENT DOCUMENTS

EP 1686461 A2 8/2006

*Primary Examiner* — David Phantana-angkool
(74) *Attorney, Agent, or Firm* — Leydig, Voit & Mayer, Ltd.

(57) ABSTRACT

A method for auto-layouting graphic objects includes: receiving input data including input image data, library data, and screen parameter data as received input data; and analyzing the received input data and creating output image data based on reshaping of the input image data based on the library data and the screen parameter data, the output image data being optimized for a specific screen defined by the screen parameter data.

20 Claims, 3 Drawing Sheets

(56) References Cited

U.S. PATENT DOCUMENTS

2019/0243144 A1* 8/2019 Bamberger .......... H04N 13/194
2020/0348900 A1* 11/2020 Zhang ................... G06F 40/169

* cited by examiner

RESPONSIVE AUTO-LAYOUTING OF INDUSTRIAL PROCESS GRAPHICS

CROSS-REFERENCE TO PRIOR APPLICATION

Priority is claimed to European Patent Application No. EP 19 165 872.3, filed on Mar. 28, 2019, the entire disclosure of which is hereby incorporated by reference herein.

FIELD

The invention relates to responsive auto-layouting of industrial process graphics. In particular, the present invention relates to a method for responsive auto-layouting of industrial process graphics.

BACKGROUND

Today, automation engineers create process graphics for specific screen sizes. This leads to a poor user experience in case the graphics are displayed on screens with different characteristics, e.g., on mobile devices. Industrial process graphics visualize an industrial production process for human operators and allow interaction with the involved automation equipment, for example sensors and actuators. Such process graphics include for example visualizations of tanks, pipes, valves, sensors, trend charts, and alarm conditions.

Automation engineers today create these graphics manually for specific screen sizes. For example, a process graphic may be created for a large overview screen in an operator control room and may span multiple adjacent screens. In an alternative, a process graphic is optimized for use in a single workstation.

Nowadays, field personal uses a multitude of different computer devices with different screen sizes, resolutions, and properties when interacting with a plant in the field. This spans from smart watches, over smart phones, to tablets, smart television devices, and even wall-spanning displays. Displaying process graphics engineered for different screens on these devices—e.g., via remote desktop or other means—may result in a cumbersome and undesired interaction with the graphic.

Operators may need to use scroll bars extensively, pinch and zoom the graphics, and even fail to activate the graphical elements they want to interact with, due to tiny activation areas. Fonts displaying sensor data may get unreadable on smaller screens, the overview of the plant may get lost on a smaller screen. This may even get worse, if field personal wears protective gloves or goggles.

Engineering differently sized screens is expensive, and automation engineers cannot foresee all possible screen variants that appear in consumer electronics markets.

In other domains, responsive web-design is a common approach to resize webpages for smaller screen sizes. While these approaches can reduce the size of images, fonts, or tables, and even suppress specific graphical elements, they do not exploit the specifics of process graphics, which allow for an informed reshaping of the graphics by exploiting domain knowledge.

SUMMARY

In an embodiment, the present invention provides a method for auto-layouting graphic objects, comprising: receiving input data comprising input image data, library data, and screen parameter data as received input data; and analyzing the received input data and creating output image data based on reshaping of the input image data based on the library data and the screen parameter data, the output image data being optimized for a specific screen defined by the screen parameter data.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
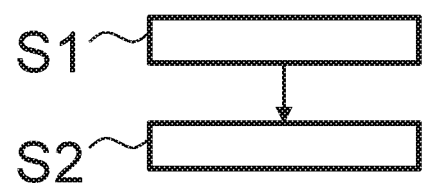
FIG. 1 shows a schematic diagram of a flowchart diagram of a method for auto-layouting graphic objects according to an embodiment of the invention.

There is a need to overcome the drawbacks from existing auto-layout implementations of video or image graphic content.

This need is met by embodiments of the present invention.

The present invention features a so-called "HMI auto layouter software" component that can convert existing process graphics to different screen characteristics. The abbreviation "HMI" stands for human machine interface. The auto layouter exploits domain knowledge about process graphics and can reshape, not only resize, graphical and textual elements as well as change the interaction points. This reduces the cost of providing displays for different screen sizes and helps field personal to more efficiently executing operation and maintenance tasks.

A first aspect of the present invention relates to a method for auto-layouting graphic objects, the method comprising the steps of receiving input data comprising input image data, library data and screen parameter data. Further, the method for auto-layouting graphic objects comprises the step of analyzing the received input data and creating output image data based on reshaping of the input image data based on the library data and the screen parameter data, the output image data optimized for a specific screen defined by the screen parameter data.

The present invention advantageously uses a software component denoted as HMI auto layouter, which can convert process graphics engineered for a specific screen to process graphics optimized for a different screen. The HMI auto layouter exploits knowledge of the graphical shapes used in typical process graphics to reshape and resize the graphics in an informed way.

Based on the present invention, for the input data, the HMI auto layouter receives:

i) process graphic designed for specific sizes (e.g., desktop, 3840×2160, UHD); and/or
ii) library of process graphic shapes and best practices for resizing (e.g., shortening pipe shapes); and/or
iii) desired screen characteristics (e.g., resolution, e.g., 2436×1125, display size, e.g., 6 inch phone or 10 inch tablet, interaction means, e.g., touch screen or not); and/or iv) classification of visual shapes in priority classes (essential vs. optional), e.g., provided via the process graphics engineering tool from a automation engineer; and/or v) context information about the task to be solved with the graphic or the situation the field operator is currently in (e.g., geographic coordinates, service log, or parameters).

The HMI Auto layouter analyzes the process graphic and identifies visual shapes that are candidates for reshaping. If a classification of shape priority classes is not available, it may refer to a library of best practices for reshaping. The HMI Auto layouter then creates a new process graphic by manipulating the existing process graphic. It may for example i) Resize fonts, eliminate text fields, create subsuming text fields, etc.

ii) Reshape pipe visuals, de/increase tank, pump, motor, turbine, compressor visual sizes iii) Eliminate trends charts or introduce placeholders or buttons for them iv) Reshape actuators visuals for easier interaction (e.g., increase size for easier selection)

v) Condense or expand visuals from multiple process graphics hierarchy levels vi) Select graphical elements according to a specific tasks (e.g. root cause analysis in a plant segment)

As output, the HMI Auto layouter creates a process graphic optimized for a specific screen and optionally for a specific task context.

According to an embodiment of the present invention, the input image data comprises receiving process graphics designed for specific screen sizes, screen resolutions, or screen types.

According to an embodiment of the present invention, the library data comprises library data including data on process graphic shapes and data on best practices for reshaping of the input image data.

According to an embodiment of the present invention, the screen parameter data comprises data on desired screen characteristics.

According to an embodiment of the invention, the data on desired screen characteristics comprises data on a desired screen resolution, data on a desired screen size, data on a desired screen type, or data on desired interaction means to be coupled to the screen.

According to an embodiment of the present invention, the method further comprises the following step of: generating a classification of visual shapes in at least one priority class for reshaping of the input image data based on the library data and the screen parameter data.

According to an embodiment of the present invention, the method further comprises the step of receiving context information about a task to be solved using the displayed graphic objects.

According to an embodiment of the present invention, the method further comprises the step of receiving context information about a user mode controlled by human-machine-interface comprising the graphic objects.

According to an embodiment of the present invention, the method further comprises the step of: identifying graphic objects that are candidates for a reshaping.

According to an embodiment of the present invention, the reshaping of the input image data at least comprises one of the following:

resizing of fonts of the input image data;
eliminating of text fields;
create subsuming text fields;
reshaping pipe visuals;
decreasing a size of an object;
increasing a size of an object;
eliminating trends charts;
introducing placeholders;
introducing buttons for the placeholders; and
reshaping dialog boxes.

A second aspect of the present invention relates to an auto layouter module for a human-machine interface, the auto layouter module comprises a receiver, which is configured to receive input data comprising input image data, library data and screen parameter data. The auto layouter module comprises a processor, which is configured to analyze the received input data and to create output image data based on reshaping of the input image data based on the library data and the screen parameter data, the output image data optimized for a specific screen defined by the screen parameter data.

According to an embodiment of the present invention, the receiver is configured to receive the input image data comprising receiving process graphics designed for specific screen sizes, screen resolutions, or screen types.

According to an embodiment of the present invention, the receiver is configured to receive the library data comprising library data including data on process graphic shapes and data on best practices for reshaping of the input image data.

According to an embodiment of the present invention, the receiver is configured to receive the screen parameter data comprising data on desired screen characteristics.

According to an embodiment of the present invention, the data on desired screen characteristics comprises data on a desired screen resolution, data on a desired screen size, data on a desired screen type, or data on desired interaction means to be coupled to the screen.

These and other aspects of the invention will be apparent from and elucidated with reference to the embodiments described hereinafter.

FIG. 1 shows a schematic diagram of a flowchart diagram of a method for auto-layouting graphic objects according to an embodiment of the invention.

The in FIG. 1 depicted method for auto-layouting graphic objects comprises the following steps:

As a first step, receiving S1 input data comprising input image data, library data and screen parameter data is performed.

As a second step, analyzing S2 the received input data and creating output image data based on reshaping of the input image data based on the library data and the screen parameter data is performed, the output image data optimized for a specific screen defined by the screen parameter data.

According to an exemplary embodiment of the present invention, the reshaping of the input image data based on the library data and the screen parameter data may for instance comprise considering the type of each received and processed input image data.

According to an exemplary embodiment of the present invention, the reshaping of the input image data may comprise specified reshaping routines for certain types of input image data.

According to an exemplary embodiment of the present invention, the shortening or expanding a pipe or a rectangular in one dimension, i.e. scaling a width, a height or a length of a displayed graphical element, instead of just scaling the displayed element on both dimensions. Thus, by means of the HMI Auto layouter advantaged adaption on different aspect ratios of different display types may be achieved using the screen parameter data.

According to an exemplary embodiment of the present invention, the HMI Auto layouter in terms of the auto layouter module may change the layout of graphics to fit the desired screen according to an exemplary embodiment of the present invention. As received input data, the HMI auto layouter receives for example at least one of the following input data:

a. Information about the device type (and available input methods) and screen size
  b. Information about the user role, context, usage history and preferences
  c. The definition of a graphics display to show, containing
     i. visual information,
     ii. structure information (hierarchical composition of displays),
     iii. topology information (connections between elements on the display)
     iv. navigation information (links to other displays)
     v. context information (links to other views and functions in the system (i.e. non-process graphics)
  d. A prioritization of the shapes and sub-elements by user role, preferences and usage history
  e. Libraries of the used shapes and sub-elements.

According to an exemplary embodiment of the present invention, the HMI Auto layouter creates one or several new graphics display definitions using the information above in the following way:

i) Visual elements on the display are filtered by their priority according to user role, context/task, and preferences
  ii) Additional visual element may be added to the display according to context, topology information, structure information and priority
  iii) Eligible shapes are adjusted to guarantee usability (e.g. ensure minimum font sizes) and
  iv) Navigation links to omitted elements or subsections of the display may be inserted
  v) Shapes and elements may be replaced with variant best suitable for a device type, if available in the libraries
  vi) Topology of the remaining elements may be adjusted to optimize the available space (e.g. graph layout algorithms may be used)
  vii) Interaction with the display and the shown shapes and elements may be adjusted to fit the device type According to an exemplary embodiment of the present invention, the HMI Auto layouter sends the created graphics display file or files to the operator's device, e.g. the phone or tablet.

According to an exemplary embodiment of the present invention, the layouting functionality is run directly on the device, e.g. the input to HMI Auto layouter as described above is sent to the client device.

Figure 2:
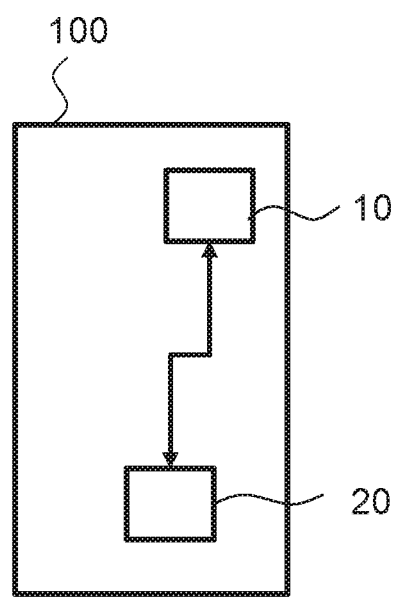
FIG. 2 shows a schematic diagram of an auto layouter module according to an embodiment of the invention.

FIG. 2 shows a schematic diagram of an auto layouter module according to an embodiment of the invention.

The auto layouter module 100 as depicted in FIG. 2 may be used for a human-machine interface, the auto layouter module comprises a receiver 10 and a processor 20.

The receiver 10 is configured to receive input data comprising input image data, library data and screen parameter data.

The processor 20 is configured to analyze the received input data and to create output image data based on reshaping of the input image data based on the library data and the screen parameter data, the output image data optimized for a specific screen defined by the screen parameter data.

According to an exemplary embodiment of the present invention, the auto-layouted versions of graphics are implemented for multiple applications depending on device types, users, tasks are available and saved in a library database.

According to an exemplary embodiment of the present invention, a subset of known device types, users and tasks are pre-created.

According to an exemplary embodiment of the present invention, priority of shapes and elements for a user and context are adjusted over time reflecting the usage history, e.g. the priorities of frequently uses elements or frequently followed navigation links are increased.

According to an exemplary embodiment of the present invention, the HMI Auto-Layout can be configured with a set of rules and expression that further specify its behavior, e.g. always replace in-line trends on tanks with numeric measurement representation.

Figure 3:
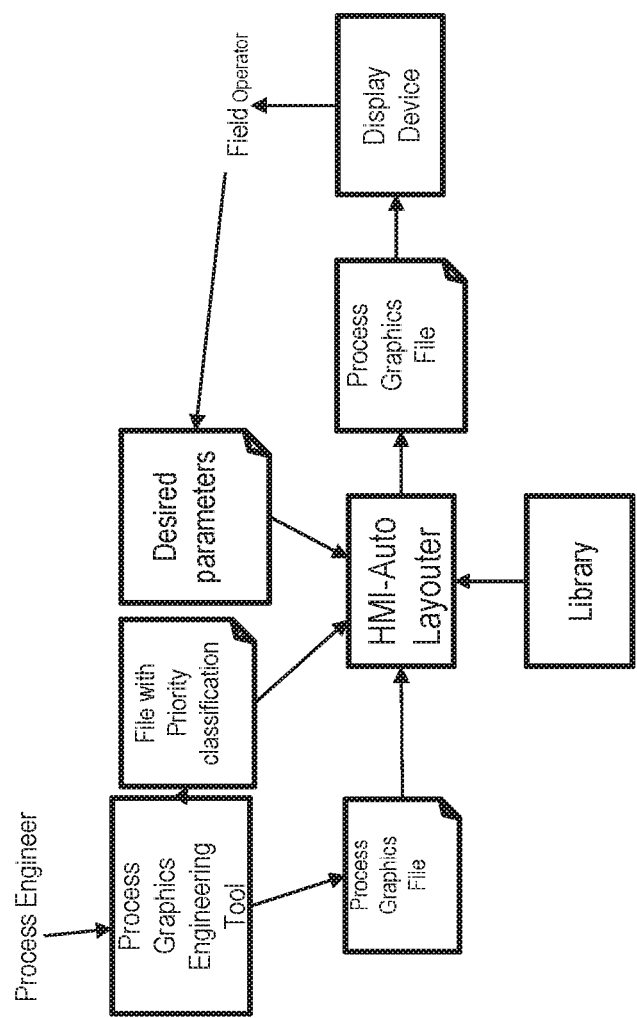
FIG. 3 shows a data flowchart of a method for auto-layouting graphic objects according to an embodiment of the invention.

FIG. 3 shows a data flowchart of a method for auto-layouting graphic objects according to an embodiment of the invention.

However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for auto-layouting graphic objects, comprising:
   receiving input data comprising input image data, library data, and screen parameter data; and
   analyzing the received input data and creating output image data based on reshaping of the input image data based on the library data and the screen parameter data, the output image data being optimized for a specific screen defined by the screen parameter data, wherein the library data comprises library data including data on process graphic shapes, data on shortening pipe shapes, and data on best practices for reshaping of the input image data.

2. The method according to claim 1, wherein the input image data comprises process graphics designed for specific screen sizes, screen resolutions, or screen types.

3. The method according to claim 1, wherein the screen parameter data comprises data on desired screen characteristics.

4. The method according to claim 3, wherein the data on desired screen characteristics comprises data on a desired screen resolution, data on a desired screen size, data on a desired screen type, or data on desired interaction means to be coupled to the screen.

5. The method according to claim 1, further comprising:
generating a classification of visual shapes in at least one priority class for reshaping of the input image data based on the library data and the screen parameter data.

6. The method according to claim 1, further comprising at least one of:
receiving context information about a task to be solved using displayed graphic objects; and/or
receiving context information about a user mode controlled by human-machine-interface comprising graphic objects.

7. The method according to claim 1, further comprising:
identifying graphic objects that are candidates for a reshaping.

8. The method according to claim 7, wherein the reshaping of the input image data at least comprises one of the following:
resizing of fonts of the input image data;
eliminating of text fields;
create subsuming text fields;
reshaping the pipe shapes;
decreasing a size of an object;
increasing a size of an object;
eliminating trends charts;
introducing placeholders;
introducing buttons for the placeholders; and
reshaping dialog boxes.

9. The method according to claim 1, wherein analyzing the received input data and creating the output image data based on reshaping of the input image data comprises using the library data on the best practices for reshaping based on a classification of shape priority classes not being available.

10. An auto layouter module for a human-machine-interface, the auto layouter module comprising:
a receiver configured to receive input data comprising input image data, library data, and screen parameter data; and
a processor configured to analyze the received input data and to create output image data based on reshaping of the input image data based on the library data and the screen parameter data, the output image data being optimized for a specific screen defined by the screen parameter data,
wherein the library data comprises library data including data on process graphic shapes, data on shortening pipe shapes, and data on best practices for reshaping of the input image data.

11. The auto layouter module according to claim 10, wherein the input image data comprises process graphics designed for specific screen sizes, screen resolutions, or screen types.

12. The auto layouter module according to claim 10, wherein the screen parameter data comprises data on desired screen characteristics.

13. The auto layouter module according to claim 12, wherein the data on desired screen characteristics comprises data on a desired screen resolution, data on a desired screen size, data on a desired screen type, or data on desired interaction means to be coupled to the screen.

14. A method for auto-layouting graphic objects, comprising:
receiving input data comprising input image data, library data, and screen parameter data; and
analyzing the received input data and creating output image data based on reshaping of the input image data based on the library data and the screen parameter data, the output image data being optimized for a specific screen defined by the screen parameter data,
wherein the library data comprises library data including data on process graphic shapes and data on best practices for reshaping of the input image data,
wherein analyzing the received input data and creating the output image data based on reshaping of the input image data comprises using the library data on the best practices for reshaping based on a classification of shape priority classes not being available.

15. The method according to claim 14, wherein the input image data comprises process graphics designed for specific screen sizes, screen resolutions, or screen types.

16. The method according to claim 14, wherein the screen parameter data comprises data on desired screen characteristics.

17. The method according to claim 16, wherein the data on desired screen characteristics comprises data on a desired screen resolution, data on a desired screen size, data on a desired screen type, or data on desired interaction means to be coupled to the screen.

18. The method according to claim 14, further comprising at least one of:
receiving context information about a task to be solved using displayed graphic objects; and/or
receiving context information about a user mode controlled by human-machine-interface comprising graphic objects.

19. The method according to claim 14, further comprising:
identifying graphic objects that are candidates for a reshaping.

20. The method according to claim 19, wherein the reshaping of the input image data at least comprises one of the following:
resizing of fonts of the input image data;
eliminating of text fields;
create subsuming text fields;
reshaping pipe visuals;
decreasing a size of an object;
increasing a size of an object;
eliminating trends charts;
introducing placeholders;
introducing buttons for the placeholders; and
reshaping dialog boxes.

* * * * *